United States Patent [19]
Akamatsu

[11] 4,084,220
[45] Apr. 11, 1978

[54] POWER CONVERTER

[75] Inventor: Masahiko Akamatsu, Amagasaki, Japan

[73] Assignee: Mitsubishi Denki Kabushiki Kaisha, Tokyo, Japan

[21] Appl. No.: 773,695

[22] Filed: Mar. 2, 1977

[30] Foreign Application Priority Data

Mar. 9, 1976 Japan .................. 51/25313

[51] Int. Cl.² ................................. H02M 5/45
[52] U.S. Cl. ............................... 363/37; 363/65
[58] Field of Search ............... 321/2, 4, 27 R; 363/34, 363/35, 37, 65, 67, 69

[56] References Cited
U.S. PATENT DOCUMENTS

| | | | |
|---|---|---|---|
| 3,823,362 | 7/1974 | Bailey | 321/45 C X |
| 3,942,090 | 3/1976 | Matthes et al. | 321/4 |
| 4,020,410 | 4/1977 | Emelyanov et al. | 321/27 R X |

*Primary Examiner*—William M. Shoop
*Attorney, Agent, or Firm*—Oblon, Fisher, Spivak, McClelland & Maier

[57] ABSTRACT

A power converter comprising a plurality of pairs of electrical valve bridges which have a plurality of electrical valves connected in each bridge between DC terminals and AC terminals connected to an AC load and a plurality of controllable DC power means for feeding pulsating unidirectional current into the DC terminals of the electrical valve bridges or out of the DC terminals whereby the unidirectional pulsating current is distributed to the plurality of pairs of electrical valve bridges for feeding to the AC load. The power converter further comprises magnetically coupled reactors connected in unidirectional pulsating current lines. Alternatively, it further comprises DC lines of the unidirectional pulsating current lines which are connected as a common lines.

19 Claims, 9 Drawing Figures

FIG. 5
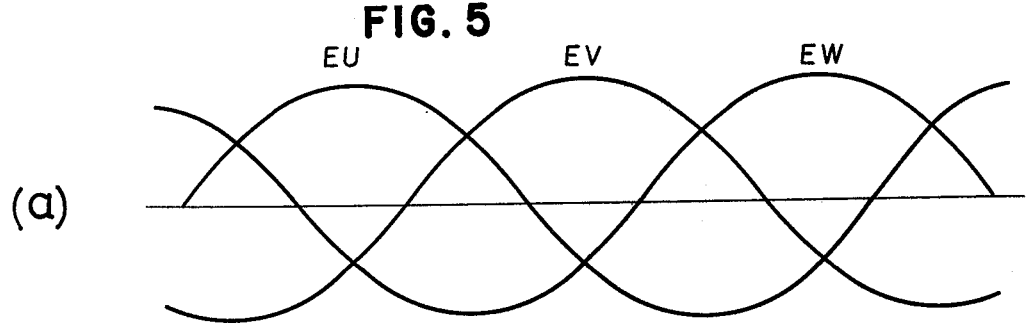
(a)
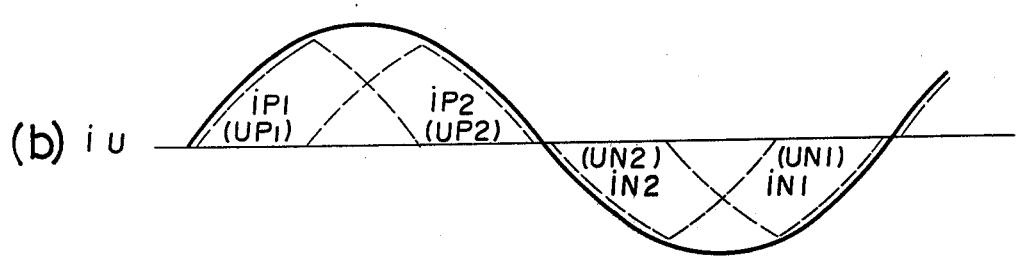
(b) iu
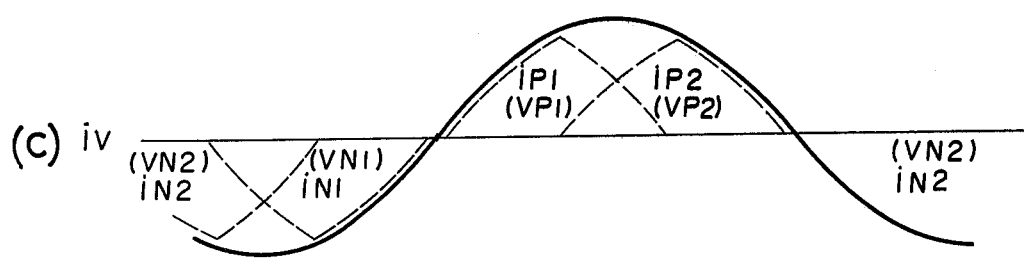
(c) iv
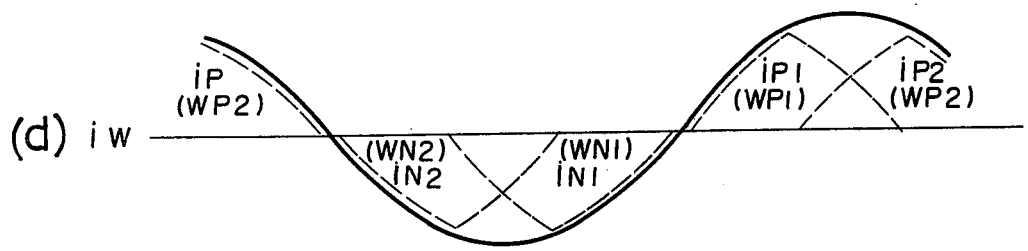
(d) iw
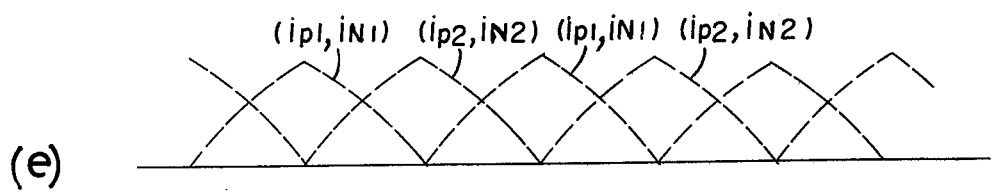
(e)

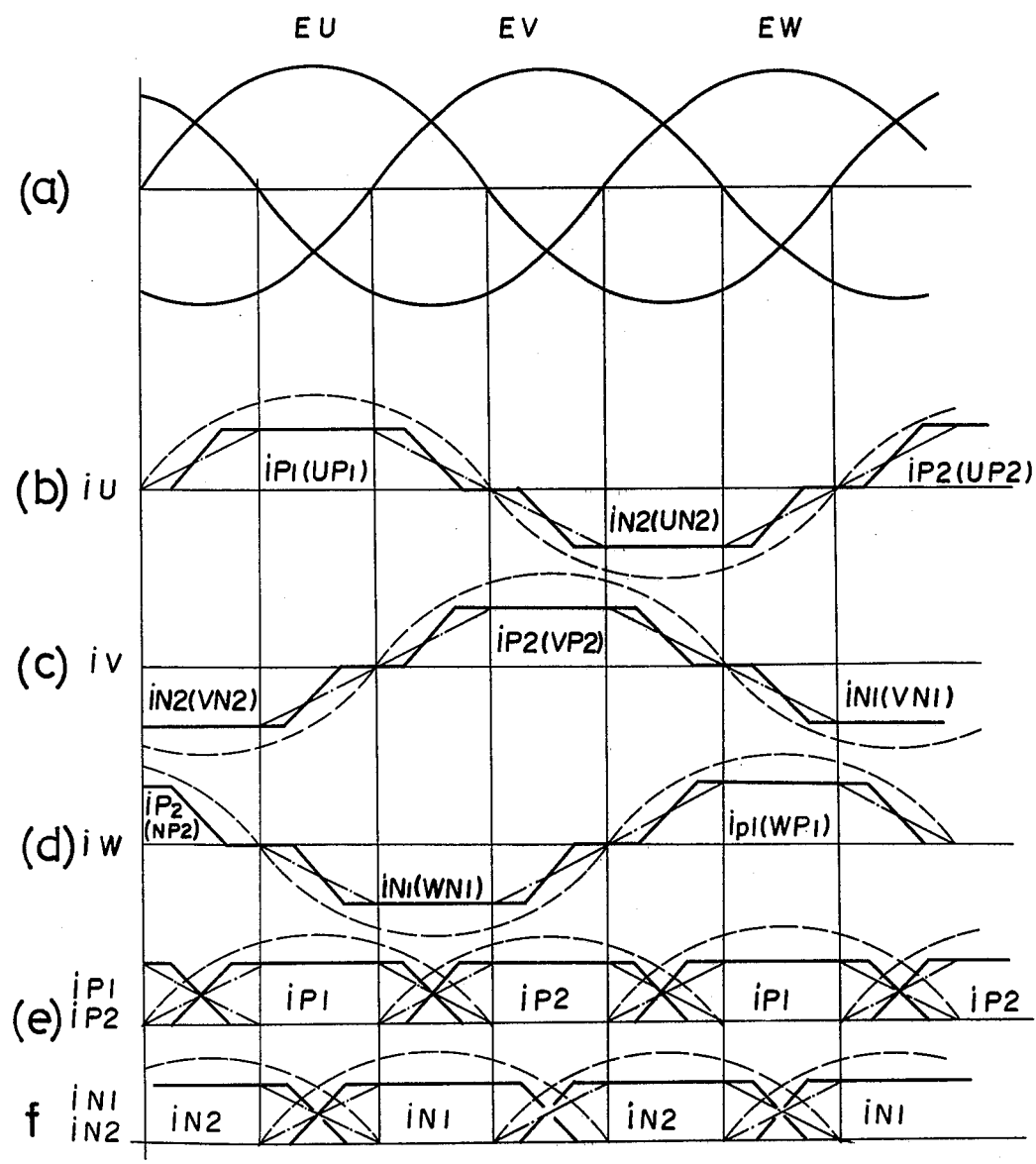

POWER CONVERTER

BACKGROUND OF THE INVENTION

1. Field of the Invention

The present invention relates to a novel power converter suitable for frequency conversion.

2. Description of the Prior Art

Various power converters for feeding to AC motors have been proposed. They have been classified to the inverter system and the cycloconverter system. Thus, the former ones have problems with commutation and the latter ones have problems with total capacity of desired power semiconductor element and the power-factor to power source, disadvantageously.

SUMMARY OF THE INVENTION

FIELD OF THE INVENTION

It is an object of the present invention to provide a novel power converter which has advantageous characteristics of both the inverter system and cycloconverter system.

The foregoing and other objects are attained in accordance with one aspect of the present invention, through the provision of a power converter which comprises a plurality of pairs of electrical valve bridges which have a plurality of electrical valves connected in each bridge between DC terminals and AC terminals connected to an AC load and a plurality of controllable DC power means for feeding pulsating unidirectional current into the DC terminals of the electrical valve bridges or out of the DC terminals whereby the unidirectional pulsating current is distributed to the plurality of pairs of electrical valve bridges for feeding to the AC load.

BRIEF DESCRIPTION OF THE DRAWINGS

Various objects features and attendant advantages of the present invention will be more fully appreciated as the same becomes better understood from the following detailed description of the present invention when considered in connection with the accompanying drawings in which:

FIGS. 5 to 8 are respectively waveforms in the operations of embodiments according to the present invention.

DETAILED DESCRIPTION OF THE PREFERRED EMBODIMENTS

Figure 1A:
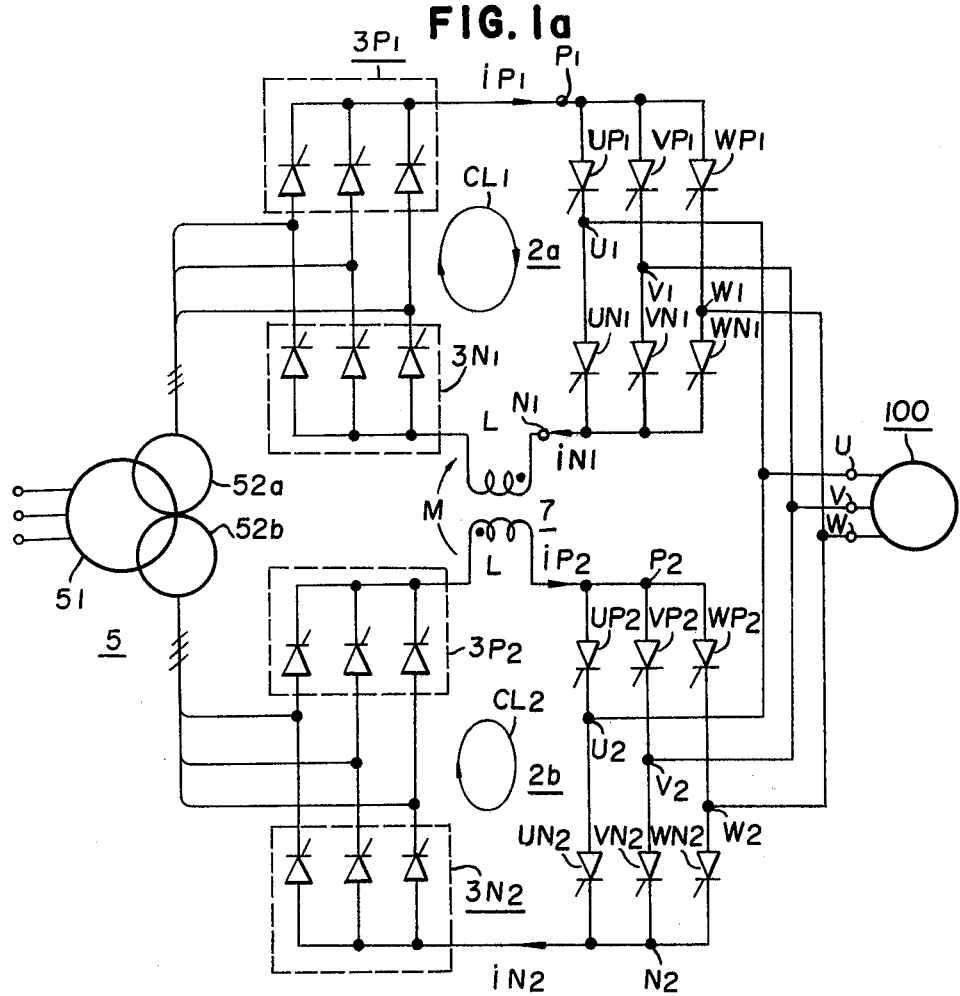
FIGS. 1 to 4 are respectively diagrams of embodiments of circuit connections.

Referring now to the drawings wherein like reference numerals designate identical or corresponding parts throughout the views, FIG. 1 is a diagram of one embodiment of the circuit connection of the power converter of the invention.

In FIG. 1, the first and second electrical valve bridges 2a, 2b are respectively connected through AC terminals ($U_1$, $V_1$, $W_1$), ($U_2$, $V_2$, $W_2$) to the AC load 100 and respectively connected through DC terminals ($P_1$, $N_1$) ($P_2$, $N_2$) to the first and second DC closed circuits $CL_1$, $CL_2$, so as to form series connected assembly of closed circuits. The DC closed circuits $CL_1$, $CL_2$ respectively comprise controllable DC power means (control rectifying power source or DC chopper) ($3P_1$, $3N_1$) ($3P_2$, $3N_2$) which are control rectifying type DC power means in the embodiment of FIG. 1. The control rectifying type DC power means are respectively connected to AC power sources $52a$, $52b$ which are second-ary windings of rectifying transformer 5 having primary windings 51 connected to an AC power source such as the original AC power source (not shown).

The first and second DC closed circuit $CL_1$, $CL_2$ comprise reactors 7 having magnetic coupling M. When the DC power means ($3P_1$, $3N_1$), ($3P_2$, $3N_2$) in the closed circuits are the secondary windings $52a$, $52b$ of the rectifying transformer under insulation, the closed circuits $CL_1$ and $CL_2$ are independently separated and accordingly, one pair of the coupling reactors 7 can be disposed at desired positions. This is shown in FIG. 1 (a).

When the DC power means ($3P_1$, $3N_1$) ($3P_2$, $3N_2$) in the closed circuits are not insulated, for example, the AC power sources $52a$ $52b$ are common noninsulated AC power sources 52, it is possible to have the coupling reactor $7a$ for positive line ($i_{P1}$ line and $i_{P2}$ line) and the coupling reactor $7b$ for negative line ($i_{N1}$ line and $i_{N2}$ line) as FIG. 1 (b).

When the common power source 52 {non-insulation of $52a$ and $52b$ is used, it is possible to use one or two pair of the coupling reactors for connecting one positive line ($i_{P2}$ or $i_{P1}$) and the other negative line ($i_{N1}$ or $i_{N2}$) as FIG. 1(a).

Figure 1B:
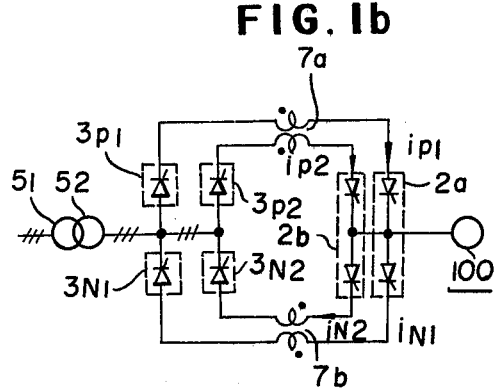

It is also possible to give 4 winding reactors which form magnetic couplings of $7a$ and $7b$ in FIG. 1(b).

Instead of the magnetic coupling reactor 7, it is possible to have the common DC line DCP for each partial DC line of the first and second DC circuits. The common DC line can have the DC reactor $7'$ is necessary.

The inductance of the common DC reactor $7'$ corresponds to mutual coupling inductance M of the coupling reactor 7 in the embodiment of FIG. 1. Moreover, when the reactors $7''a$, $7''b$ are connected in the independent partial DC lines (arrow lines $i_{P1}$, $i_{P2}$, $i_{N1}$, $i_{N2}$) of the first and second DC closed lines as shown by the dotted line, the inductance of the independent DC line inductance corresponds to the inductance of the non-coupling part of the coupling reactor in the embodiment of FIG. 1.

Figure 2:
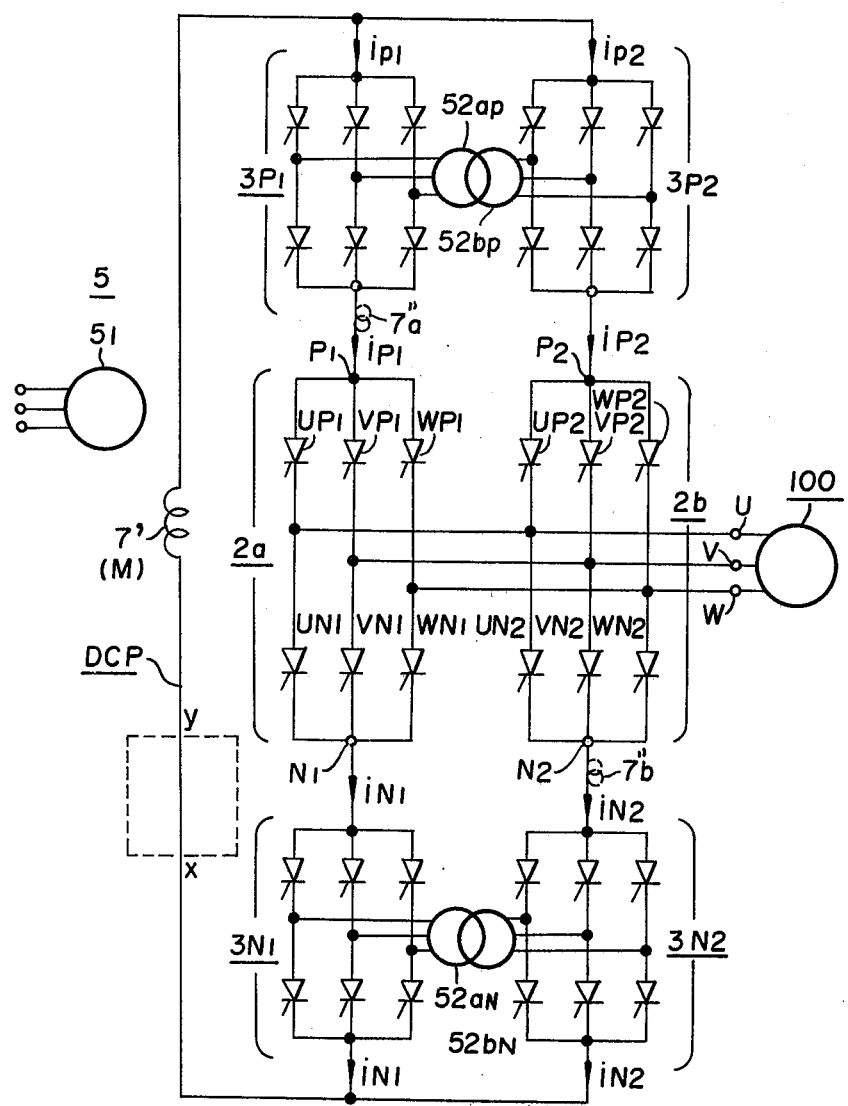

In the embodiment of FIG. 2, independent control rectifying type controllable DC power means ($3P_1$, $3N_1$, $3P_2$, $3N_2$) are respectively connected in each DC line (arrow lines $i_{P1}$, $i_{N1}$, $i_{P2}$, $i_{N2}$) to each of the positive and negative DC terminals of the electrical valve bridges $2a$, $2b$, and the means are respectively all wave bridge type rectifiers. The AC power sources $52a$P, $52b$P, $52a$N, $52b$N of the rectifiers are mutually insulated.

It is possible to form non-insulated common AC power source for positive lines or negative lines. These embodiments are illustrated referring to FIGS. 3 and 4.

The embodiments of FIG. 1 and FIG. 2 can be operated as follows.

FIGS. 5 to 8 show waveforms in the operations of the embodiments.

The Y connection equated voltages in each of the phases of the AC load 100 such as an AC motor are designated as Eu, Ev, Ew and the waveforms thereof are shown as FIGS. 5a, 6a, 7a and 8a. In order to simplify the illustration, the waveforms are shown in the phase relation in the case of 0° of AC load power-factor angle. However, it is the same with the case of phase difference between voltage and current.

The operation of the embodiment in FIG. 5 will be illustrated.

The currents ($i_{P1}$, $i_{N1}$) ($i_{P2}$, $i_{N2}$) passing through the DC terminals $P_1$, $N_1$, $P_2$, $N_2$ of the electrical valve bridges 2a, 2b are $i_{P1} \approx i_{N1}$ and $i_{P2} \approx i_{N2}$, and are the pulsating current which have triangle waveform having partially sine waveform and are intermittent with different pulsating phases.

The pulsation is given at a ratio of $m$ times per one cycle of the AC load when $n$ designates the number of phases of the AC terminals of the AC load.

In the connection diagrams of FIGS. 1 and 2, $m = 3$ and accordingly, the case of $m = 3$ will be illustrated referring to FIG. 5.

The pulsation is shifted for 1/N period of the pulsation period ($1/m \cdot N$ period of the AC output period) when N designates the number of the electrical valve bridges and the DC closed circuit CL.

In the embodiment, $N=2$ and the sum of one wave of the first pulsating current ($i_{P1} = i_{N1}$) and one wave of the second pulsating current ($i_{P2} = i_{N2}$) is determined to be a half-wave of the total AC output. In this embodiment, a sine half-wave is formed.

Taking the U phase Ac load current $i_U$ in FIGS. 1 and 2, the positive sine half-wave is given by combining the positive line component $i_{P1}$ of the first pulsating current passing through the electrical valve $UP_1$ of the first electrical valve bridge 2a and the positive line component $i_{P2}$ of the second pulsating current passing through the electrical valve $UP_2$ of the second electrical valve bridge 2b.

The U phase negative half-wave is given by combining the negative line component $i_{N2}$ of the second pulsating current passing through the electrical valve $UN_2$ of the second electrical valve bridge 2b and the negative line component $i_{N1}$ of the first pulsating current passing through the electrical valve $UN_1$ of the first electrical valve bridge 2a.

The first and second pulsating currents $i_{P1}$, $i_{N1}$) ($i_{P2}$, $i_{N2}$) are distributed through the first electrical valve bridge and the second electrical valve bridge on the other phases V and W as the same manner.

In the distribution, the pulsating currents ($i_{P1}$, $i_{N1}$), ($i_{P2}$, $i_{N2}$) shown in FIGS. 5(c) (d) are passed through the electrical valves ($VN_1$), ($VN_2$), ($VP_1$), ($VP_2$), ($WP_1$), ($WP_2$), ($WN_1$), ($WN_2$) as shown in FIG. 5 (c) (d). Thus, the sine wave AC can be given between the load 100.

FIG. 5(e) shows a relation of the phases in the case of feeding the current in the same phase of the load voltage. It is possible to pass the AC current in a desired phase relation whereby the power can be applied as desired.

Figure 6:
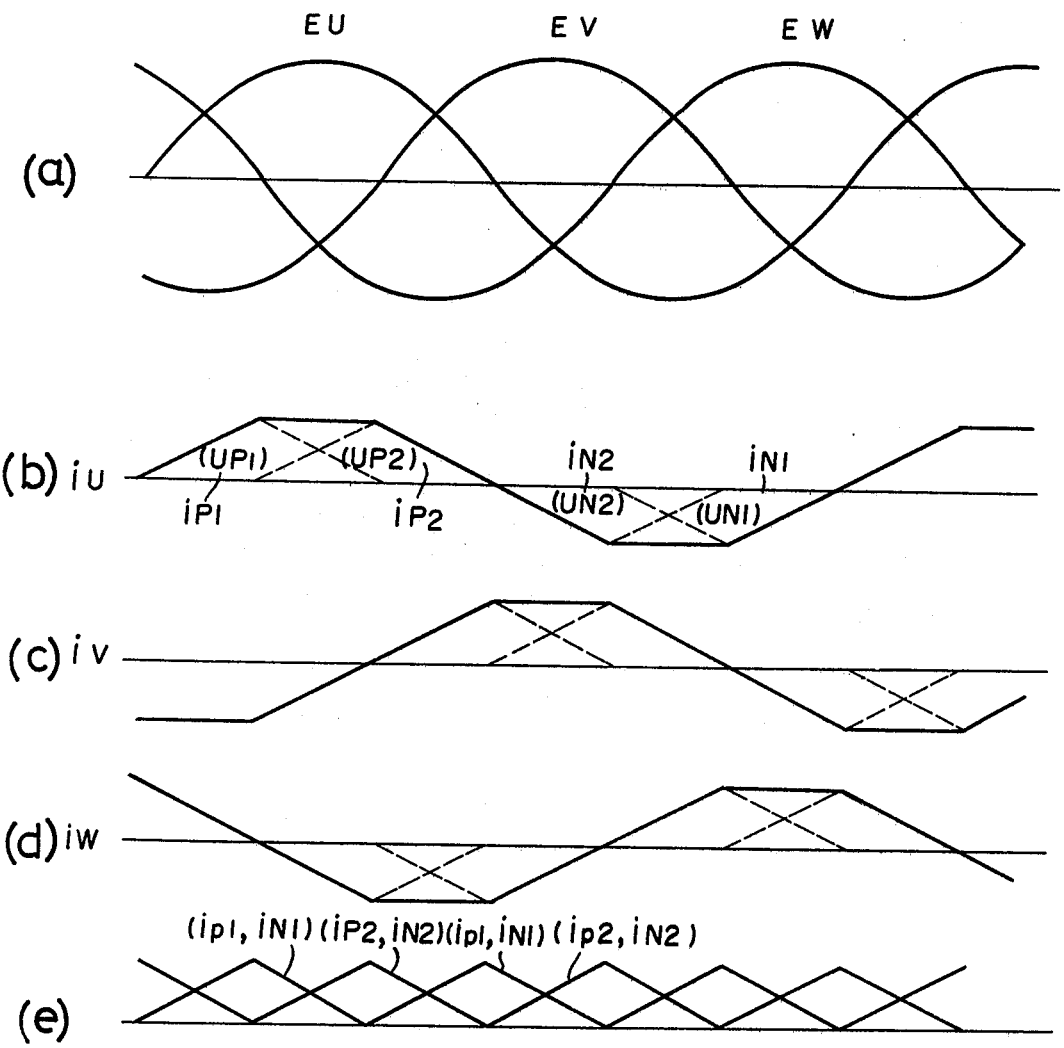

FIG. 6 is the waveforms in the case of the pulsating currents ($i_{P1}$, $i_{N1}$), ($i_{P2}$, $i_{N2}$) having triangle waveforms as FIG. 6(e) and the AC currents $i_U$, $i_V$, $i_W$ having trapezoid waveforms as FIGS. 6(b), (c), (d).

In the trapezoid wave AC current feeding method, the sum of the pulsating currents ($i_{P1}$, $i_{N1}$) ($i_{P2}$, $i_{N2}$) is constant whereby the pulsation is not caused for the current or the power to the power source 51 behind of the controllable DC power means ($3P_1$, $3N_1$), ($3P_2$, $3N_2$).

Figure 7:
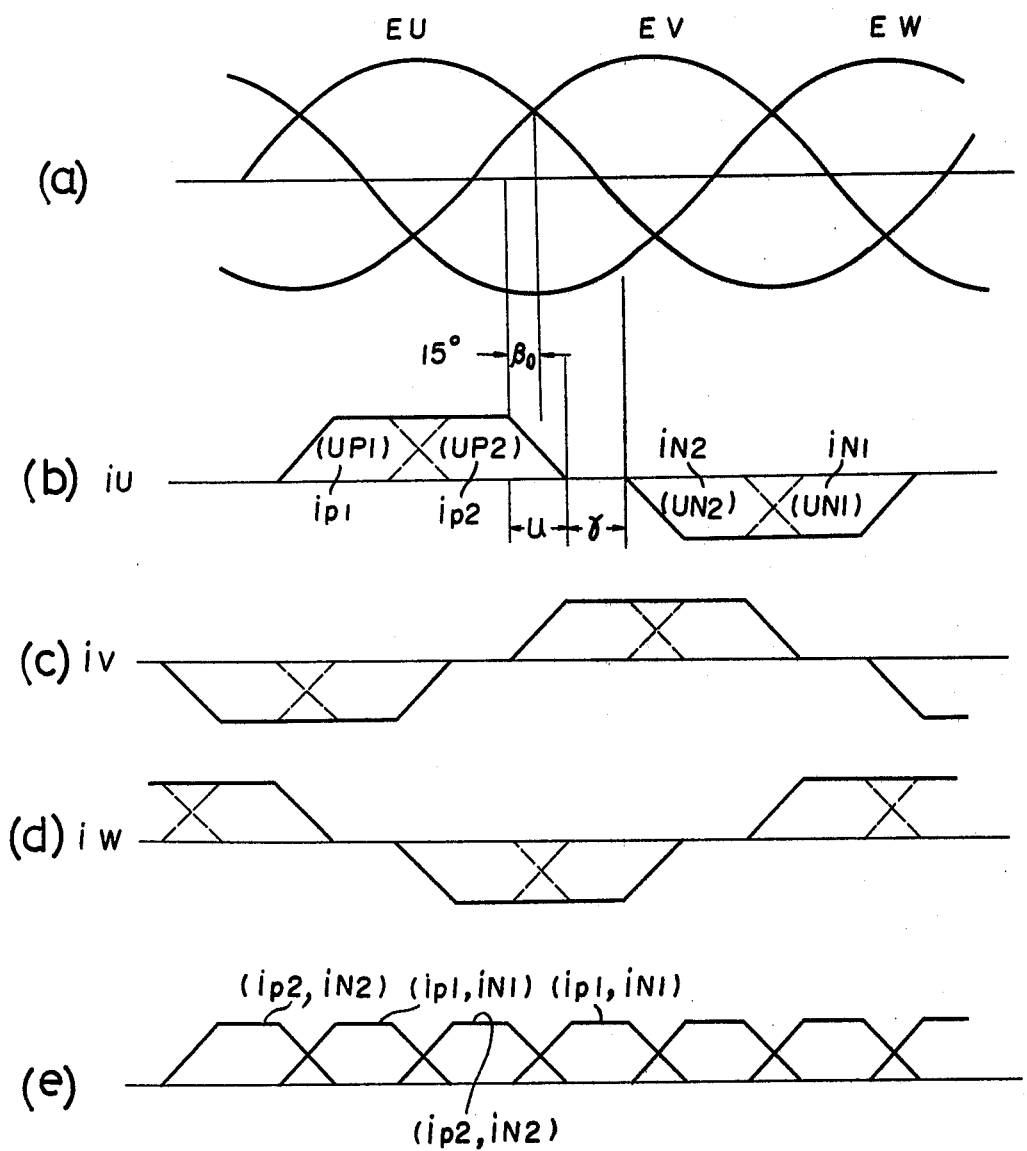

In FIG. 7, the pulsating current ($i_{P1}$, $i_{N1}$) ($i_{P2}$, $i_{N2}$) has a trapezoid waveform or rectangular waveform as FIG. 7 (e). In the case of the three-phase AC load in the trapezoid waveform, the rising section, the peak flat section, the falling section, the quiescent section are respectively 1/12 period of the AC output.

The pulsating current ($i_{P1}$, $i_{N1}$) is shifted from the pulsating current ($i_{P2}$, $i_{N2}$) for ½ period (1/6 period of the AC output) of the pulsating period as the same with those of FIGS. 5 and 6.

When the trapezoid pulsating currents ($i_{P1}$, $i_{N1}$) ($i_{P2}$, $i_{N2}$) are distributed to the AC load by the electrical valve bridges 2a 2b as the same manner of FIG. 5, the trapezoid waveform having broad flat part as shown in FIGS. 7 (b), (c), (d) can be formed.

In the operation of the embodiment as shown in FIG. 7, the section of the pulsating current can be long enough whereby the commutation of the electrical valve bridges 2a, 2b can be easily attained. Accordingly, in the case of the same controllable power means, it can be used for the AC load having higher frequency.

FIG. 8 is the waveform showing the operation of the another embodiment for pulsating current having longer pulsating period.

In FIG. 8, the pulsating currents $i_{P1}$, and $i_{P2}$ are alternatively passed and the pulsating currents $i_{N1}$, and $i_{N2}$ are alternatively passed; of course, this is controlled by the controllable DC power means.

As shown in FIGS. 8 (e), (f), the pulsating current has the half-wave trapezoid waveform shown by the full line or the half-wave sine waveform shown by the dotted line or the half-wave rectangular waveform. (not shown. ⅙ period of the AC output in the case of three-phase AC load).

In the trapezoid waveform, the rising section and the falling section of the current can be 1/6 period of the AC output (shown by a chain line). The waveform can be selected as desired in practice.

The U phase positive half-wave is alternatively given by the first pulsating current $i_{P1}$ passing through the $UP_1$ of the first electrical valve bridge 2a and the second pulsating positive current $i_{P2}$ passing through the $UP_2$ of the second electrical valve bridge 2b.

The U phase negative half-wave is alternatively given by the second pulsating negative current $i_{N2}$ passing through the $UN_2$ of the second electrical valve bridge 2b and the first pulsating negative current $i_{N1}$ passing through the $UN_1$ of the first electrical valve bridge 2a.

The V phase positive half-wave is alternatively given by $i_{P2}$ passing through $VP_2$ and $i_{P1}$ passing through $VP_1$.

The V phase negative half-wave is alternatively given by $i_{N1}$ passing through $VN_1$ and $i_{N2}$ passing through $VN_2$.

The W phase positive half-wave is alternatively given by $i_{P2}$ passing through $WP_2$ and $i_{P1}$ passing through $WP_1$.

The W phase negative half-wave is alternatively given by $i_{N1}$ passing through $WN_1$ and, $i_{N2}$ passing through $WN_2$.

Thus, as shown in FIGS. 8 (b), (c), (d), the AC current having trapezoid waveform, sine waveform (including similar ones) or rectangular waveform can be formed and fed.

In the operation of the embodiment as shown in FIG. 8, the non-current section (quiescent time) of the same pulsating current can be enough long, whereby the frequency of the AC output by the same controllable power means can be increased. Moreover, the pulsating period of the pulsating current is long whereby it can be used for the AC load having higher frequency.

When the operation of FIG. 8 is given in the embodiment of FIG. 1, the controllable power means in the other groups should return-pass each other because of $i_{P1} \neq i_{N1}$ and $i_{P2} \neq i_{N2}$.

Accordingly, it is difficult to operate it when it is fed from the insulated power sources 52d, 52b as shown in FIG. 1 (a), but it is possible to operate it in the embodiment connecting to the non-insulated common power sources 52 as shown in FIG. 1 (b).

The operation of FIG. 8 can be attained in the non-insulated pulsating circuit systems having the joint lines for $i_{P1}$ and $i_{N2}$ and the joint lines for $i_{P2}$ and $i_{N1}$ as the embodiments of FIG. 1 (b) and FIG. 2.

In the connection of FIG. 1, the mutual inductance M of the coupling reactor 7 is affected as the common line inductance to the two pulsating currents $(i_{P1}, i_{N1})$ $(i_{P2}, i_{N2})$. That is, the increase of the current in one side causes the decrease of the current in the other side whereas the decrease of the current in one side causes the increase of the current in the other side. That is, it has the smoothing effect to the sum of both unidirectional pulsating currents, and the differential change of both unidirectional pulsating currents is not prevented.

Accordingly, the change of the pulsating currents $(i_{P1}, i_{N1})$ $(i_{P2}, i_{N2})$ for reverse directional change as shown in FIGS. 5 to 8, is not substantially prevented.

The coupling inductance M is equivalent to the inductance 7' inserted in the common line DCP. Accordingly, the same operation can be attained in the embodiment of FIG. 2.

In FIG. 2, the common inductance 7' imparts the smoothing effect (small effect in a region having small di/dt near peak value of sine waveform) to $(i_{P1} + i_{P2})$ without preventing the differential change of $(i_{P1} - i_{P2})$. Thus, the increase of the unidirectional pulsating current in one side causes the decrease of the unidirectional pulsating current in the other side.

In FIG. 2, the inductances 7"a, 7"b inserted in each unidirectional pulsating current line correspond to the non-coupling inductance of the reactor of FIG. 1 and can be inserted as protective current limiting reactor. (dotted line).

In any case, it is possible to prevent the inhibition of the change of pulsating of each unidirectional pulsating current by coupling the unidirectional pulsating current line with the coupling reactor or by forming the common DC line.

Figure 3:
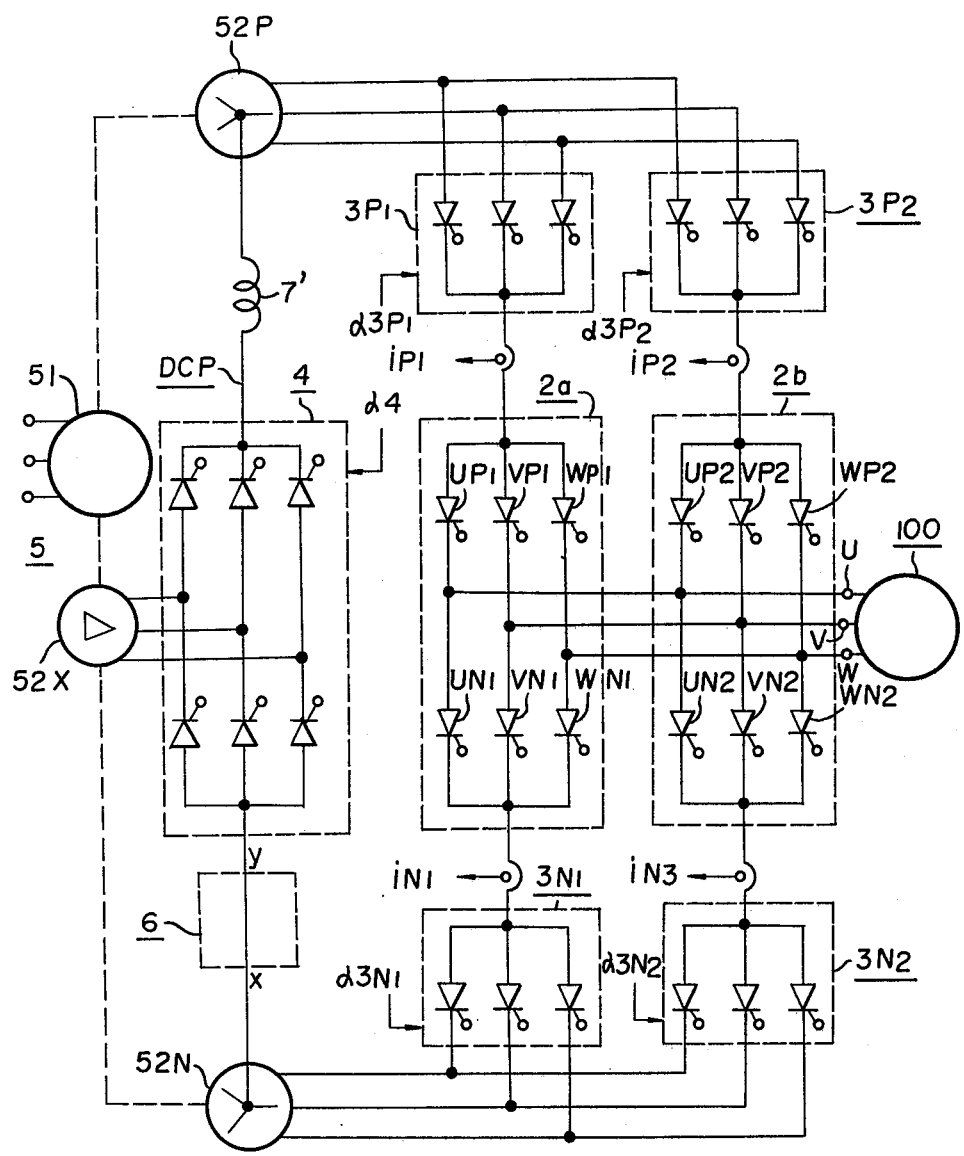

FIG. 3 is a connection diagram of another embodiment.

The common DC power source 4 is inserted in the common DC line DCP of FIG. 2, and the controllable DC power means $3P_1$, $3P_2$, $3N_1$, $3N_2$ are formed by multi-phase half-wave electrical valve circuits.

The common DC power source 4 is connected to the secondary winding 52x of the power transformer 5 in Δ connection.

The secondary windings 52p of the transformer for half-wave electrical valve circuit of the controllable DC power means is Y connection whereby the reverse phase half-wave currents are respectively induced to the primary winding 51 of the power transformer to give the resultant currents of the power source in equivalent to the Y connection all wave rectification.

When both AC voltages (line voltage) are equal, the resultant currents in the Δ connection of the secondary windings 52x are power current corresponding to the 12 phase rectification.

The operation of the embodiment of FIG. 3 can be attained as shown by the waveforms in FIGS. 5 to 8.

When the voltage of the AC load 100 is high, a part of the voltage can be given by the common DC power source 4. The ratio of the voltage given by the common DC power source can be varied as desired depending upon the ratio of the voltage of the first secondary winding (52P, 52N) to the voltage of the secondary winding 52x.

The power source commutation is increased, depending upon increase in the ratio of voltage. The current can be fed to high power-factor load or delay power-factor load.

The same secondary line voltages (ratio of voltage 1:1) is optimum for lowering the higher harmonic wave of the power source 51 and providing relatively high commutating function.

Figure 4:
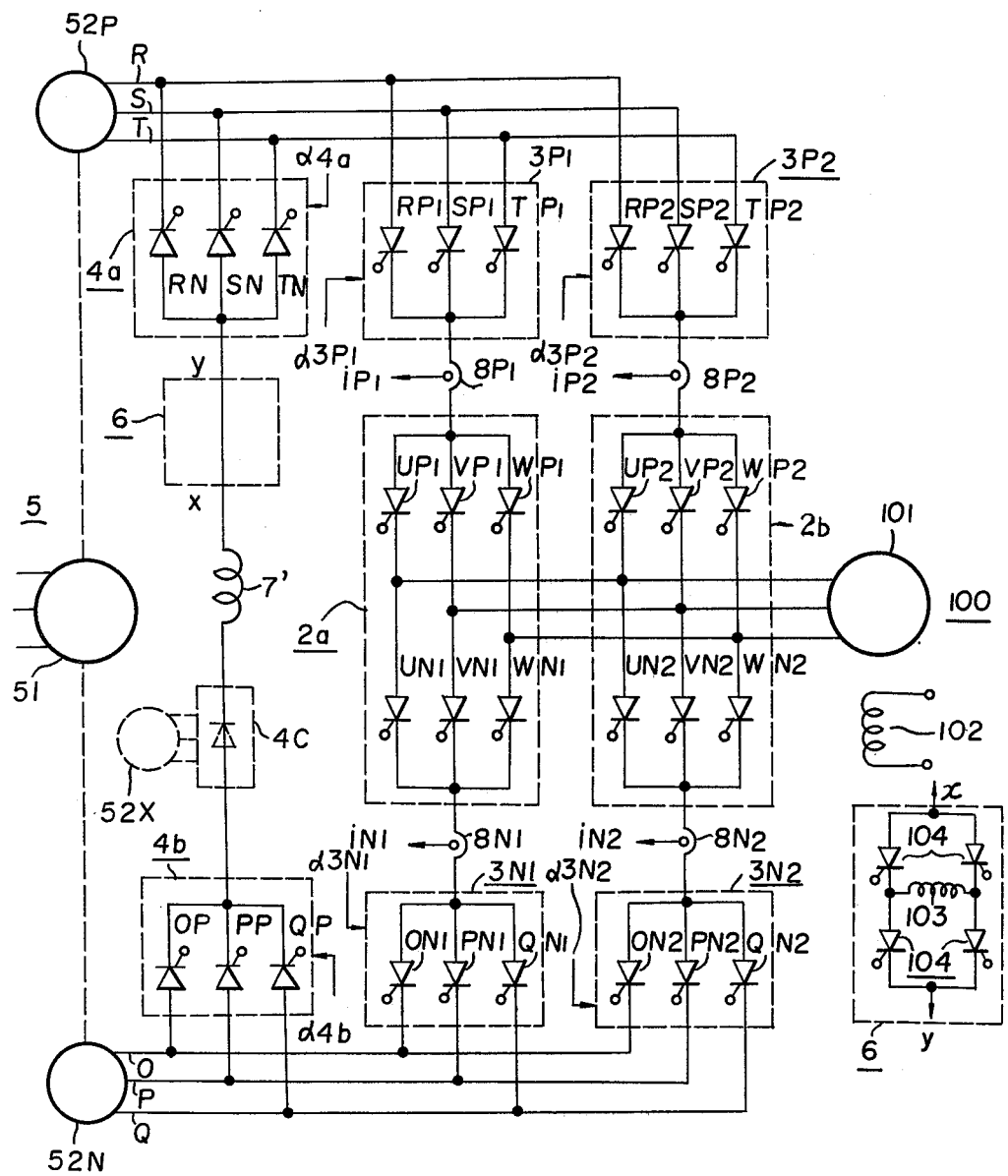

FIG. 4 is a connection diagram of another embodiment of the invention and is the equivalent of the embodiment of FIG. 3 to give the same AC voltage of the second secondary winding 52x with the AC voltage of the first secondary windings (52P, 52N). The positive half-wave of the first secondary winding 52P is used as the controllable DC power means $3P_1$, $3P_2$ and the negative half-wave of the first secondary winding 52N is used as the first half part 4a of the common DC power source 4, and the negative half-wave of the first secondary winding 52N is used as the controllable DC power means $3N_1$, $3N_2$ and the positive half-wave of the first secondary winding 52N is used as the second half part 4b of the common DC power source 4.

It is possible to connect the common DC power source 4c and the secondary winding 52x of the transform as shown by the dotted line.

The operation can be attained as shown by the waveforms in FIGS. 5 to 8 as the same with those of FIG. 3.

When the AC load 100 is an armature 101 of a synchronous machine, it is possible to have a separately excited field winding 102 and a proportional exciting winding 103 such as a series field winding or a compensating winding (or interpole winding).

The proportional exciting circuit means 6 comprising the proportional exciting winding 103 and suitable polarity switching means 104 can be connected in series to the common DC lines x y as shown by the dotted line of FIG. 4. It is also possible to separately control the proportional exciting winding 103 by excitation in proportional to the current of the common DC line.

In the above-mentioned embodiments, the control operation for alloting the unidirectional pulsating current to the AC load 100 by the electrical valve bridges 2a, 2b has been illustrated. When the AC load has an internal electromotive force as the synchronous machine to be capable of feeding reactive power, the control DC power sources 3 are controlled by the continuous DC control in a relatively high speed region having enough electromotive force whereby the unidirectional current is continued and the electrical valve bridge can be used as the separated exciting natural commutation inverters which are commutated by internal electromotive force of machine itself and are operated in parallel.

Accordingly, it is possible to attain the two commutation mode changing operation to operate by the above-mentioned pulsating commutation in the low speed region and to operate by the natural internal electromotive force commutated inverter operation in the high speed region.

In accordance with the embodiment of FIG. 4, the common DC power source is connected to the common DC line to give the voltage corresponding to the load voltage as the same with that of FIG. 3 and the use of the secondary windings (52P, 52N) of the transformer are increased in comparison with that of the embodiment of FIG. 3. (all wave secondary windings).

In accordance with the present invention, the inhibition of pulsating variation of the unidirectional pulsatrectional pulsating line with the coupling reactor or using the common DC lines, and the symmetrical AC current can be fed to the AC load by pulsating at a rate of *m* or *m*/2 times per one cycle to the AC load having *m* phases of the terminals.

What is claimed is:

1. A power converter which comprises a plurality of pairs of electrical valve bridges having a plurality of electrical valves connected in each bridge between DC terminals and AC terminals connected to an AC load, and a plurality of controllable DC power means for feeding pulsating unidirectional current into the DC terminals of the electrical valve bridges or out of the DC terminals, wherein said controllable DC power means are electrically connected to each other, and a plurality of reactors magnetically coupled to each other and connected in unidirectional pulsating current lines whereby the unidirectional pulsating current is allotted to the plurality of pairs of electrical valve bridges for feeding to the AC load.

2. A power converter according to claim 1 wherein each coupling reactor is connected to each of positive and negative lines of each unidirectional pulsating current line.

3. A power converter which comprises a plurality of pairs of electrical valve bridges having a plurality of electrical valves connected in each bridge between DC terminals connected to unidirectional pulsating current lines and AC terminals connected to an AC load, a plurality of controllable DC power means for feeding pulsating unidirectional current into the DC terminals of electrical valve bridges or out of the DC terminals, and DC lines of said unidirectional pulsating current lines connected as a common line, wherein a common DC power source is inserted in said common DC line.

4. A power converter comprising:
a plurality of electrical valve bridges, each of the plurality of electrical valve bridges having a plurality of electrical valves, a pair of DC input nodes, and a plurality of AC output nodes respectively connected to a plurality of AC input terminals of an AC load, each of the plurality of electrical valves being connected between one of the DC input nodes and one of the AC output nodes;
a plurality of DC power control means, each of the plurality of DC power control means having a pair of pulsating output terminals connected to the pair of DC input nodes of each of the plurality of electrical valve bridges through one pair of a plurality of pairs of pulsating DC lines;
pulsating direct currents being fed in different phase relation to the input nodes of the electrical valve bridges through the pulsating DC lines from the DC power control means and controlled by the DC power control means in synchronous relation with the control of the electrical valves; and
a plurality of reactors magnetically coupled to each other and respectively inserted in series to a plurality of the pulsating DC lines;
whereby the pulsating direct currents are converted to alternating currents for feeding the alternating currents to the AC load, and commutation of the electrical valves is assisted by pulsation of the pulsating direct currents.

5. A power converter comprising:
a plurality of electrical valve bridges, each of the plurality of electrical valve bridges having a plurality of electrical valves, a pair of DC input nodes, and a plurality of AC output nodes respectively connected to a plurality of AC input terminals of an AC load, each of the plurality of electrical valves being connected between one of the DC input nodes and one of the AC output nodes;
a plurality of DC power control means, each of the plurality of DC power control means having a pair of pulsating output terminals connected to the pair of DC input nodes of each of the plurality of electrical valve bridges through one pair of a plurality of pairs of pulsating DC lines;
pulsating direct currents being fed in different phase relation to the input nodes of the electrical valve bridges through the pulsating DC lines from the DC power control means and controlled by the DC power control means in synchronous relation with the control of the electrical valves; and
a common DC line included in the plurality of said DC power control means to carry a current which is a combination of the pulsating direct currents;
whereby the pulsating direct currents are converted to an alternating currents for feeding the alternating currents to the AC load, and commutation of the electrical valves is assisted by pulsation of the pulsating direct currents.

6. The power converter according to claim 5 including: a reactor inserted in series with said common DC line.

7. The power converter according to claim 4 including an AC power source and wherein each of said plurality of DC power control means includes a controlled rectifier circuit having a source-terminal connected to the AC power source.

8. The power converter according to claim 7 wherein said AC power source includes a transformer having a primary winding and a plurality of secondary windings, each of the plurality of secondary windings connected to a source-terminal of each of the controlled rectifier circuits.

9. The power converter according to claim 5 including an AC power source and wherein each of said plurality of DC power control means includes a controlled rectifier circuit having a source-terminal connected to the AC power source.

10. The power converter according to claim 9 wherein said AC power source includes a transformer having a primary winding and a plurality of secondary windings, each of the plurality of secondary windings connected to a source-terminal of each of the controlled rectifier circuits.

11. The power converter according to claim 4 wherein at least two of said DC power control means are together connected to a common source.

12. The power converter according to claim 11 wherein each of said reactors is inserted in series to each of positive and negative lines of each of the pairs of the plurality of pairs of said pulsating DC lines.

13. The power converter according to claim 5 wherein at least two of said DC power control means are together connected to a common source.

14. The power converter according to claim 5 including: a common DC power source inserted in series with said common DC line.

15. The power converter according to claim 4 wherein each said pulsating direct current has a waveform, wherein said waveform is
 a. a resolved waveform which is solution of a half of a sine waveform, b. a half of a sine waveform,
c. a triangular waveform, or
d. a trapezoidal waveform.

16. The power converter according to claim 5 wherein each said pulsating direct current has a waveform, wherein said waveform is
a. a resolved waveform which is solution of a half of sine waveform,
b. a half of sine waveform,
c. a triangular waveform, or
d. a trapezoidal waveform.

17. A power converter comprising:
a pair of electrical valve bridges, each of the pair of bridges having a plurality of electrical valves, a pair of DC input nodes and three AC output nodes respectively connected to three AC input terminals of a three-phase AC load, and each of said electrical valves is connected between each of the DC input nodes and each of the AC output nodes; and
a plurality of DC power control means, each of the plurality of DC power control means having a pair of pulsating output terminals connected to the pair of DC input nodes of each of the plurality of electrical valve bridges through one pair of a plurality of pairs of pulsating DC lines;
pulsating direct currents being fed in different phase relation to the input nodes of the electrical valve bridges through the pulsating DC lines from the DC power control means and controlled by the DC power control means in synchronous relation with the control of the electrical valves;
wherein the pulsating frequency of one of said pulsating direct currents is given to be equal to 1.5 times the frequency of said AC load.

18. A power converter comprising:
an AC load having a plurality of AC input terminals;
at least two electrical valve bridges, each of the bridges having a positive DC input node, a negative DC input node, a plurality of AC output nodes, and a plurality of electrical valves, each of the plurality of electrical valves being connected between each of both of the positive DC input node and the negative DC input node and each of the AC output nodes, said AC output node being connected to the AC input terminals of said AC load, said electrical valves of each of said relation with the control of said electrical valves for supplying said pulsating direct currents synchronized with said AC current to said pulsating DC lines.

19. A power converter comprising:
an AC load having a plurality of AC input terminals;
at least two electrical valve bridges, each of the bridges having a positive DC input node, a negative DC input node, a plurality of AC output nodes, and a plurality of electrical valves, each of the plurality of electrical valves being connected between each of the both of the positive DC input node and the negative DC input node and each of the AC output nodes, said AC output nodes being connected to the AC input terminals of said AC load, said electrical valves of each of said electrical valve bridges being sequentially controlled to carry an AC current of said AC load;
at least two positive pulsating DC lines, one end of each DC line being connected to each of the positive DC input nodes of said electrical valve bridges;
at least two negative pulsating DC lines, one end of each DC line being connected to each of the negative DC input nodes of said electrical valve bridges;
positive pulsating direct currents flowing through each of said positive pulsating DC lines, each pulsating in a different time-sequence to each other;
negative pulsating direct currents flowing through each of said negative pulsating DC lines, each pulsating in a different time-sequence to each other;
at least two positive DC power control means, each of the positive DC power control means having a negative return terminal and a positive pulsating output terminal, each of the positive output terminals being connected to each of the other ends of the positive pulsating DC lines;
at least two negative DC power control means, each of the negative DC power control means having a positive return terminal and a negative pulsating output terminal, each of the negative output terminals being connected to each of the other ends of the negative pulsating DC lines;
the negative return terminals being together connected to one end of a common DC line, the positive return terminals being together connected to the other end of said common DC line;
whereby the DC power control means are respectively controlled in synchronous relation with the control of said electrical valves for supplying said pulsating direct currents synchronized with said AC current to said pulsating DC lines.

* * * * *